United States Patent
Doshi et al.

(10) Patent No.: US 11,093,398 B2
(45) Date of Patent: Aug. 17, 2021

(54) REMOTE MEMORY OPERATIONS FOR COMPUTING SYSTEMS WITH SHARED MEMORY

(71) Applicant: Intel Corporation, Santa Clara, CA (US)

(72) Inventors: Kshitij Doshi, Tempe, AZ (US); Harald Servat, Barcelona (ES); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 214 days.

(21) Appl. No.: 16/457,826

(22) Filed: Jun. 28, 2019

(65) Prior Publication Data

US 2019/0324911 A1 Oct. 24, 2019

(51) Int. Cl.
*G06F 12/0831* (2016.01)
*G06F 9/54* (2006.01)
*G06F 12/0842* (2016.01)

(52) U.S. Cl.
CPC .......... *G06F 12/0833* (2013.01); *G06F 9/544* (2013.01); *G06F 12/0835* (2013.01); *G06F 12/0842* (2013.01)

(58) Field of Classification Search
None
See application file for complete search history.

(56) References Cited

U.S. PATENT DOCUMENTS

| 2015/0081977 A1* | 3/2015 | Kottapalli | G06F 12/0817 711/130 |
| 2016/0188474 A1* | 6/2016 | Wang | G06F 9/45558 711/119 |
| 2017/0344283 A1* | 11/2017 | Guim Bernat | G06F 3/0619 |

\* cited by examiner

*Primary Examiner* — Denise Tran
(74) *Attorney, Agent, or Firm* — Schwabe, Williamson & Wyatt, P.C.

(57) ABSTRACT

Embodiments may include systems and methods for performing remote memory operations in a shared memory address space. An apparatus includes a first network controller coupled to a first processor core. The first network controller processes a remote memory operation request, which is generated by a first memory coherency agent based on a first memory operation for an application operating on the first processor core. The remote memory operation request is associated with a remote memory address that is local to a second processor core coupled to the first processor core. The first network controller forwards the remote memory operation request to a second network controller coupled to the second processor core. The second processor core and the second network controller are to carry out a second memory operation to extend the first memory operation as a remote memory operation. Other embodiments may be described and/or claimed.

17 Claims, 8 Drawing Sheets

REMOTE MEMORY OPERATIONS FOR COMPUTING SYSTEMS WITH SHARED MEMORY

FIELD

Embodiments herein relate generally to the technical fields of computing systems, and more particularly to computing systems with shared memory.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

To increase computing performance, multiple computing devices, or nodes, may be coupled together to form memory-pooled or shared memory systems, e.g., remote direct memory access (RDMA) systems. The partitioned global address space (PGAS) model is a parallel programming model that may be implemented by multiple computing devices sharing a memory, e.g., a global memory address space, aiming to improve programmer productivity and system performance. However, for some computing systems with shared memory address spaces, the performance of current implementations of some remote memory operations may not be satisfactory.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
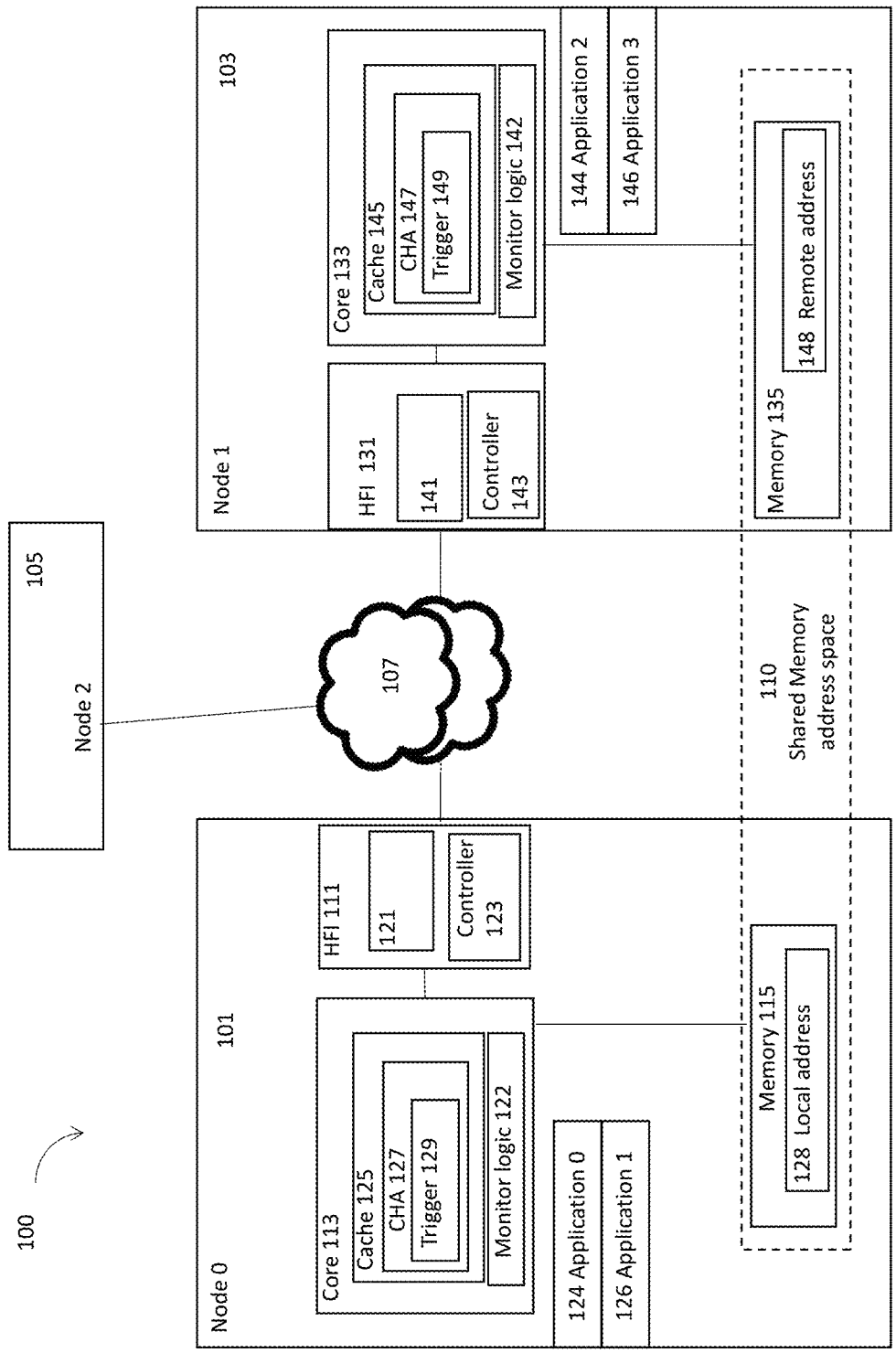
FIG. 1 illustrates an example computing system having a memory address space shared by multiple computing devices, in accordance with various embodiments.

Apparatuses, methods and storage media associated with a computing system having a memory address space shared by multiple computing devices are described herein. In some instances, the apparatus for a computing system having a memory address space includes a first network controller coupled to a first processor core and a network switch. The first network controller is to process a remote memory operation request. The remote memory operation request is generated by a first memory coherency agent (CHA) based on a first memory operation for an application operating on the first processor core. The remote memory operation request is associated with a remote memory address that is local to a second processor core coupled to the first processor core through the network switch. The first network controller is further to forward the remote memory operation request through the network switch to a second network controller coupled to the second processor core. The second processor core and the second network controller are to carry out a second memory operation at the remote memory address local to the second processor core. The second memory operation corresponds to the remote memory operation request generated based on the first memory operation.

In some instances, a method for a first processor core in a computing system having a memory address space includes receiving a memory operation instruction to operate on a memory address in a shared memory address space, where the memory operation instruction is for an application operating on the first processor core. The method further includes determining the memory address to be a remote memory address that is local to a second processor core. Afterward, the method includes generating a remote memory operation request corresponding to the memory operation instruction to operate on the remote memory address, and transmitting the remote memory operation request to a network controller to be forward to the second processor core.

In some instances, a computing device in a computing system having a memory address space includes a first processor core, and a first network controller coupled to the first processor core. The first processor core is arranged to generate a remote memory operation request based on a first memory operation for an application operating on the first processor core. The remote memory operation request is associated with a remote memory address that is local to a second processor core coupled to the first processor core through a network switch. The first network controller is to process the remote memory operation request generated by the first processor core, and forward the remote memory operation request through the network switch to a second network controller coupled to the second processor core. The second processor core and the second network controller are to carry out a second memory operation that is to extend the first memory operation through the network switch, the first network controller, and the second network controller.

To increase computing power, multiple computing devices, or nodes, are coupled together through communication technologies, e.g., network switches or computer buses, to form memory-pooled or shared memory systems, e.g., remote direct memory access (RDMA) systems. Many memory operations performed on one computing device can be extended into remote memory operations at another computing device of the computing system with a shared memory address space. For example, the memory monitoring or wait operations from the x86 instruction set architecture (ISA), e.g., MONITOR/MWAIT instruction, are valuable to coordinate multi-threaded applications. In detail, the MONITOR/MWAIT instructions monitor memory addresses and wait until the contents of such addresses have been modified by instructions executed in different cores or threads. A counterpart remote memory operation of MONITOR/MWAIT will be useful in memory-pooled or shared memory systems.

In general, some memory operations, e.g., memory monitoring or wait, can be extended to remote memory operations by emulating such memory operations in software. Software may do so on top of already existing network layers, e.g., based on transmission control protocol (TCP). An application operating in a computing node and intending to monitor a remote memory address in a remote node would instantiate a daemon on the remote node. Afterwards, the daemon further invokes the MONITOR/MWAIT instruction pair at the remote node, or poll the remote memory address periodically until the remote memory address has been modified. Once a modification of the remote memory address is detected, the daemon will notify the application. However, such a software approach based on the daemon has a large overhead in resources and performance to monitor a single remote memory address. Furthermore, such an implementation of the remote memory operations are not reliable since there are many kind of errors happening in the process, e.g., scheduling errors, network delays and timeouts, once-and-only-once notification semantics, or software bugs in operating systems and applications.

Embodiments herein extend some memory operations, e.g., MONITOR/MWAIT instructions, performed on one computing device into remote memory operations at another computing device of a computing system with a shared memory address space. The computing system includes multiple computing devices interconnected through a network and network controllers. Memory pools or shared memory address spaces are hosted in disaggregated memory drawers, accelerators, or any other device that can host memory or addressable storage. Instead of using a software emulation of the local memory operations remotely, embodiments herein employ a network controller and a processor core to work together. In detail, a network controller is to process a remote memory operation request from a processor core of a computing node, configure the local monitoring logic, and send a callback to the requestor when a trigger is generated by the aforementioned monitoring logic for a particular configured memory operation. Embodiments herein are described based on current architecture platform, but can be applicable to any architecture having a memory or storage controller managing a set of multiple memory or storage devices. The memory operations MONITOR and MWAIT are used as examples. Other memory operations are extended into remote memory operations similarly. In addition, the computing system has a shared memory address space, which are shared between any two computing devices of the system, or shared by all computing devices of the system.

Remote memory operations presented in embodiments herein allow one-sided writes from an event, notification, data, or packet producer, to trigger activation of dependent tasks at other nodes through memory based monitoring. Embodiments herein permit many-to-many, many-to-one, one-to-many synchronization with each party monitoring and receiving notifications without explicit peer-to-peer or multicasting group notifications. Remote memory waits allow multiple tasks to proceed forwards from barriers even if they are waiting at different nodes. The extended remote memory operations are applicable to computing devices sharing memory in a same node, in a passive memory pool, or in a distributed shared memory environment. Hence, embodiments herein provide uniform, flexible, and high performance ad-hoc data and task coordination and event synchronization among tasks or activities without requiring the computing devices to join, manage, and leave multicasting groups. As a result, embodiments herein unify symmetric multiprocessing (SMP) scale-up programming with distributed shared memory (DSM) scale-out programming. In addition, partitioned global address space (PGAS) parallel programming models would benefit in terms of performance. For example, it becomes efficient to implement distributed locking. In some cases, it is possible to remove the need for distributed lock based exclusion for many usages. As large pools of shared memory based access becomes a way of achieving memory elasticity and facilitating direct and seamless shared memory based multi-node scaling, this capability becomes very valuable in removing programming discontinuities between scale-up and scale-out computations. Techniques presented in embodiments herein can further facilitate deployment of cloud-native solutions in which memory is tiered across node boundaries. These type of functionalities are going to be more important as scale-out and disaggregated memory pools solutions where software architecture with highly complex dependences are becoming more relevant (Amazon® lambdas, distributed edge cloud Internet of Things (IoT), etc.).

The following detailed description refers to the accompanying drawings. The same reference numbers are used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments are practiced in other examples that depart from these specific details. In certain instances, descriptions of well-known devices, circuits, and methods are omitted so as not to obscure the description of the various embodiments with unnecessary detail.

Operations of various methods are described as multiple discrete actions or operations in turn, in a manner that is most helpful in understanding the claimed subject matter. However, the order of description should not be construed as to imply that these operations are necessarily order dependent. In particular, these operations are not performed in the order of presentation. Operations described may be performed in a different order than the described embodiments. Various additional operations may be performed and/or described operations may be omitted, split or combined in additional embodiments.

For the purposes of the present disclosure, the phrases "A/B," "A or B," and "A and/or B" mean (A), (B), or (A and B). For the purposes of the present disclosure, the phrases "A, B, or C" and "A, B, and/or C" mean (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As discussed herein, the term "module" may be used to refer to one or more physical or logical components or elements of a system. In some embodiments, a module may be a distinct circuit, while in other embodiments a module may include a plurality of circuits.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices", "computer systems", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, or network elements.

FIG. 1 illustrates an example computing system 100 having a memory address space 110 shared by multiple computing devices, e. g., a computing device 101, a computing device 103, in accordance with various embodiments. In embodiments, the computing device 101 and the computing device 103 are coupled by a network switch 107. A computing device may be referred to as a node or a computing node as well. The computing device 101 includes a network device 111, a processor core 113, and a memory device 115. The computing device 103 includes a network device 131, a processor core 133, and a memory device 135. The network switch 107 is coupled to the network device 111 and the network device 131. In addition, the computing system 100 includes other computing devices, e.g., a computing device 105, coupled to the network switch 107, the computing device 101, or the computing device 103.

In embodiments, for the computing device 101, the network device 111 is coupled to the processor core 113. The processor core 113 includes various storage devices, e.g., a cache 125, the memory device 115. A memory coherency agent (CHA) 127 operates on the processor core 113 to manage the memory coherency of the cache 125 and the memory device 115. The processor core 113 further includes other components, e.g., a monitor logic 122. An operating system operates on the processor core 113 to support various applications, e.g., an application 124, an application 126. In addition, the network device 111 includes a network controller 123, and a local storage 121. The network device 111 may be a host fabric interface (HFI), or a network interconnect card (NIC).

In embodiments, for the computing device 103, the network device 131 is coupled to the processor core 133. The processor core 133 includes various storage devices, e.g., a cache 145, the memory device 135. A CHA 147 is to operate on the processor core 133 to manage the memory coherency of the cache 145 and the memory device 135. The processor core 133 further includes other components, e.g., a monitor logic 142. An operating system operates on the core 133 to support various applications, e.g., an application 144, or an application 146. In addition, the network device 131 includes a network controller 143, and a local storage 141. The network device 131 may be a HFI, or a NIC.

In embodiments, the memory device 115 is a local memory device to the processor core 113, while the memory device 135 is a local memory device to the processor core 133. In addition, the memory device 115 and the memory device 135 are shared between the processor core 113 and the processor core 133 to form the shared memory address space 110. Hence, the memory device 135 is accessible to the processor core 113 as a remote memory address, and the memory device 115 is accessible to the processor core 133 as a remote memory address.

In some embodiments, the computing device 103 has a same or similar functions as the computing device 101. Functions performed by the network device 131 and the processor core 133 are to be performed by the network device 111 and the processor core 113 as well. Similarly, functions performed by the network device 111 and the processor core 113 are able to be performed by the network device 131 and the processor core 133, respectively.

Figure 2A:
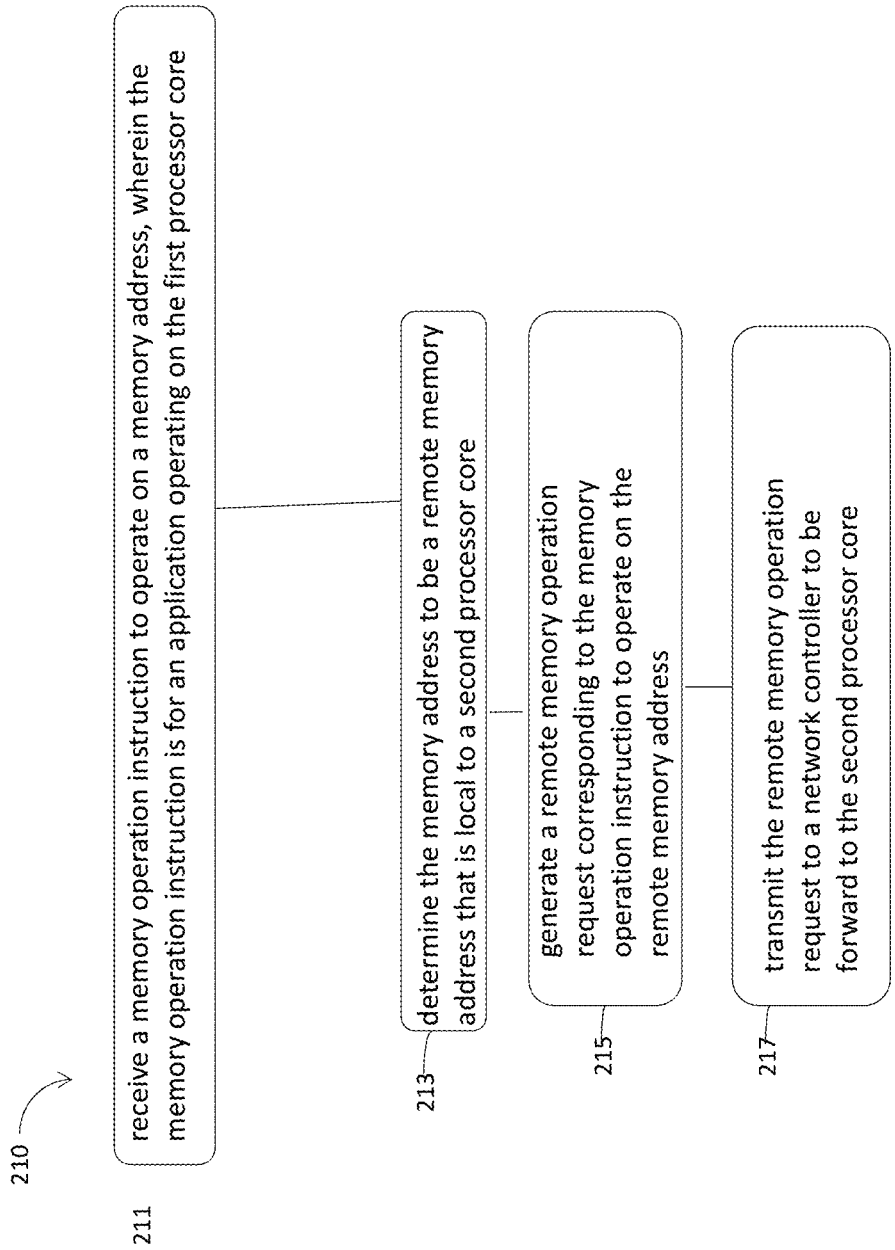
FIGS. 2(a)-2(b) illustrate example processes of remote memory operations performed by a network controller or a processor core of a computing device included in a computing system having a shared memory address space, in accordance with various embodiments.
Figure 2B:
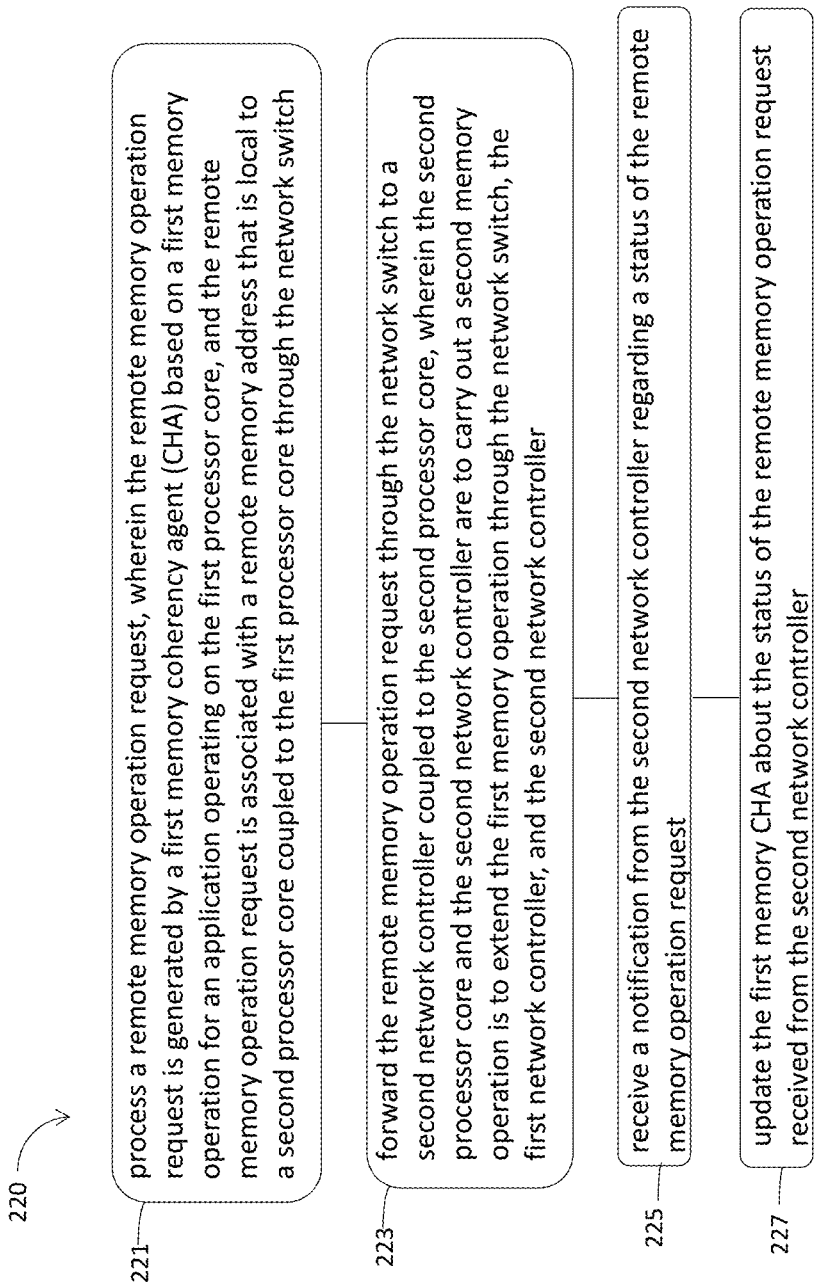

In embodiments, the processor core 113 or the CHA 127 operating on the processor core 113 performs various operations. FIGS. 2(a)-2(b) illustrate example processes 210 and 220 of remote memory operations performed by a network controller or a processor core of a computing device included in a computing system having a shared memory address space, in accordance with various embodiments. In embodiments, the process 210 is performed by the processor core of the computing device 101 and the computing device 103, and the process 220 is performed by the network controller of the computing device 101 and the computing device 103.

As shown by the process 210 in FIG. 2(a), at an interaction 211, the processor core 113 or the CHA 127 is to receive a memory operation instruction to operate on a memory address, where the memory operation instruction is for an application, e.g., the application 124, operating on the processor core 113. The memory operation may be a memory monitor operation, a memory wait operation, a merged memory monitor and wait operation, or some other memory operations. The memory address is a local address 128 corresponding to a storage location in the memory device 115. Additionally and alternatively, the memory address is a remote memory address 148 of the memory device 135, which is local to the processor core 133.

At an interaction 213, the processor core 113, or the CHA 127 is to determine the memory address to be a remote memory address, e.g., the remote memory address 148, which is local to the processor core 133. At an interaction 215, the processor core 113 or the CHA 127 is to generate a remote memory operation request corresponding to the memory operation instruction to operate on the remote memory address 148. The remote memory operation request is a request for a remote memory operation, e.g., a remote memory monitor operation, a remote memory wait operation, or a merged remote memory monitor and wait operation. At an interaction 217, the processor core 113 or the CHA 127 is to transmit the remote memory operation request to the network controller 123 to be forwarded to the processor core 133. In some embodiments, the remote memory operation request includes the remote memory address 148. In addition, the processor core 113 or the CHA 127 is further to receive a status of the remote memory operation request from the network controller 123, where the status is based on a remote memory operation executed on the processor core 133, and the remote memory operation corresponding to the remote memory operation request. Furthermore, the processor core 113 or the CHA 127 is to report a result of the memory operation instruction for the application 124 based on the status of the remote memory operation request.

Furthermore, the computing device 101 is to receive a remote memory operation request from another computing device, e.g., the computing device 105. The network controller 123 is to receive the remote memory operation request and configure the processor core 113 to perform operations related to the received remote memory operation request. In detail, the processor core 113 is to receive a memory operation or a memory operation request from the network controller 123, where the memory operation corresponds to a remote memory operation request received by the network controller 123, and is associated with a local memory address of the memory device 115. The processor core 113 performs the memory operation with respect to the local memory address, and notify the network controller 123 about a status of the memory operation.

In embodiments, the network controller 123 performs various operations. As shown by the process 220 in FIG. 2(b), at an interaction 221, the network controller 123 is to process the remote memory operation request generated by the processor core 113 or the CHA 127, where the remote memory operation request is associated with a remote memory address, e.g., the remote memory address 148, that is local to the processor core 133. The remote memory operation request is generated by the CHA 127 based on a first memory operation for the application 124 operating on the processor core 113. In some embodiments, the remote memory operation request is a request for a remote memory monitor operation, a remote memory wait operation, or a merged remote memory monitor and wait operation.

In embodiments, at an interaction 223, the network controller 123 is further to forward the remote memory operation request through the network switch 107 to the network controller 143 coupled to the processor core 133. The processor core 133 and the network controller 143 are to carry out a second memory operation to extend the first memory operation through the network switch 107, the network controller 123, and the network controller 143. Furthermore, at an interaction 225, the network controller 123 is to receive a notification from the network controller 143 regarding a status of the remote memory operation request. In addition, at an interaction 227, the network controller 123 is to update the CHA 127 about the status of the remote memory operation request received from the network controller 143.

In embodiments, except for the teachings of the present disclosure incorporated, the computing device 101 or the computing device 103 may otherwise be any computing system, for example, a laptop computer, an ultra-laptop computer, a tablet, a touch pad, a portable computer, a handheld computer, a wearable device, a palmtop computer, a personal digital assistant (PDA), an e-reader, a cellular telephone, a combination cellular telephone/PDA, a mobile smart device (e.g., a smart phone, a smart tablet, etc.), a mobile internet device (MID), a mobile messaging device, a mobile data communication device, a mobile media playing device, a camera, a mobile gaming console, etc. In embodiments, the computing device 101 or the computing device 103 may also be a non-mobile device that may include, but is not to be limited to, for example, a personal computer (PC), a television, a smart television, a data communication device, a media playing device, a gaming console, a gateway, an IOT device, etc. The computing device 101 or the computing device 103 includes processors, controllers, such as the processor core 113 or the processor core 133, and other components that execute software and/or control hardware to execute local programs or consume services provided by external service providers over a network. The computing device 101 or the computing device 103 may also, or instead, include a web interface running in a browser from which the electronic apparatus can access such web-based services. The computing device 101 or the computing device 103 may also include storage devices to store logic and data associated with the programs and services used by the computing device 101 or the computing device 103.

In embodiments, the processor core 113 or the processor core 133 may be a central processing unit (CPU) located in a printed circuit board (PCB). In some embodiments, the processor core 113 or the processor core 133 may be a programmable device that may execute a program. In embodiments, the processor core 113 or the processor core 133 may be a microcontroller, a 16-bit processor, a 32-bit processor, a 64-bit processor, a single core processor, a multi-core processor, a digital signal processor, an embedded processor, or any other processor. In embodiments, an operating system may be operated on the processor core 113 or the processor core 133, which may include the system driver for various protocols, the first protocol, or the second protocol. The operating system may include any system software that manages hardware or software resources for the computing device 101 or the computing device 103, and may provide services to applications. The operating system may be Windows®, Android OS, iOS, Linux, a real-time operating system (RTOS), an automotive infotainment operating system, among others. For example, the operating system may be a real-time operating system such as VxWorks, PikeOS, eCos, QNX, MontaVista Linux, RTLinux, Windows CE, or other operating system.

Figure 6:
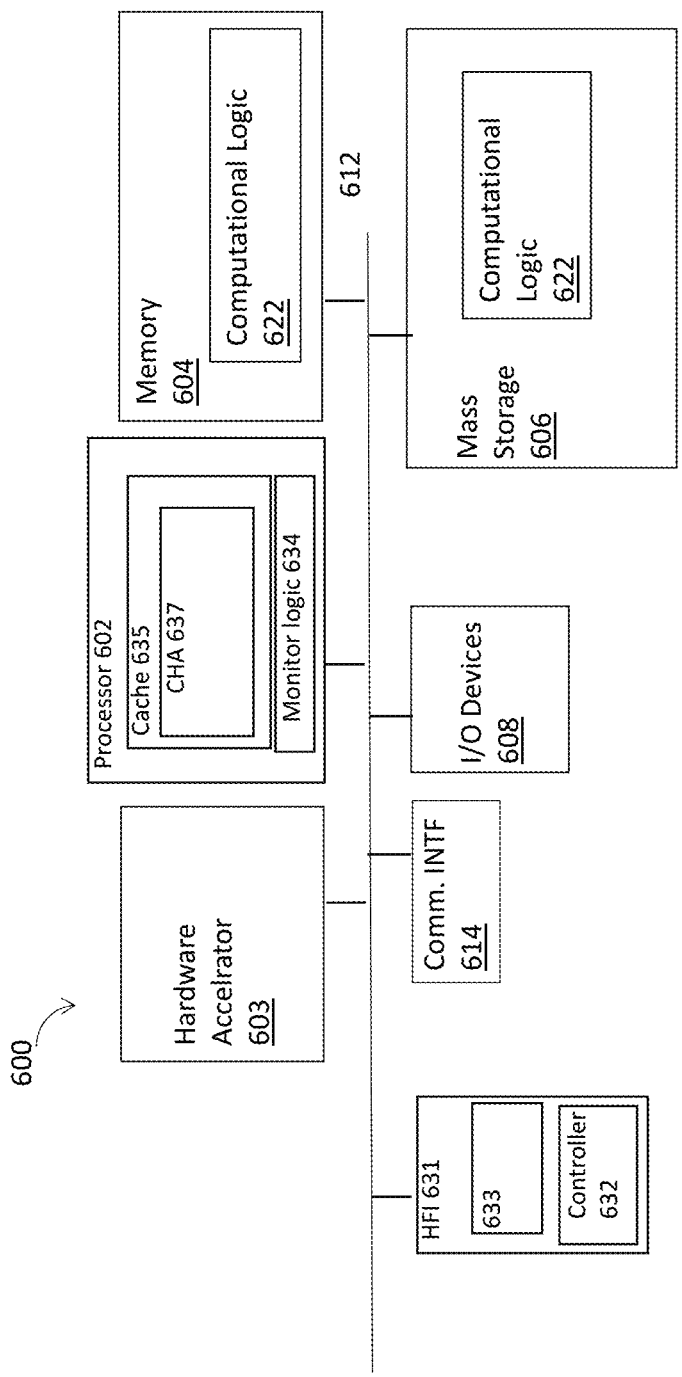
FIG. 6 illustrates a hardware component view of a computing platform suitable to practice the present disclosure, in accordance with various embodiments.
Figure 7:
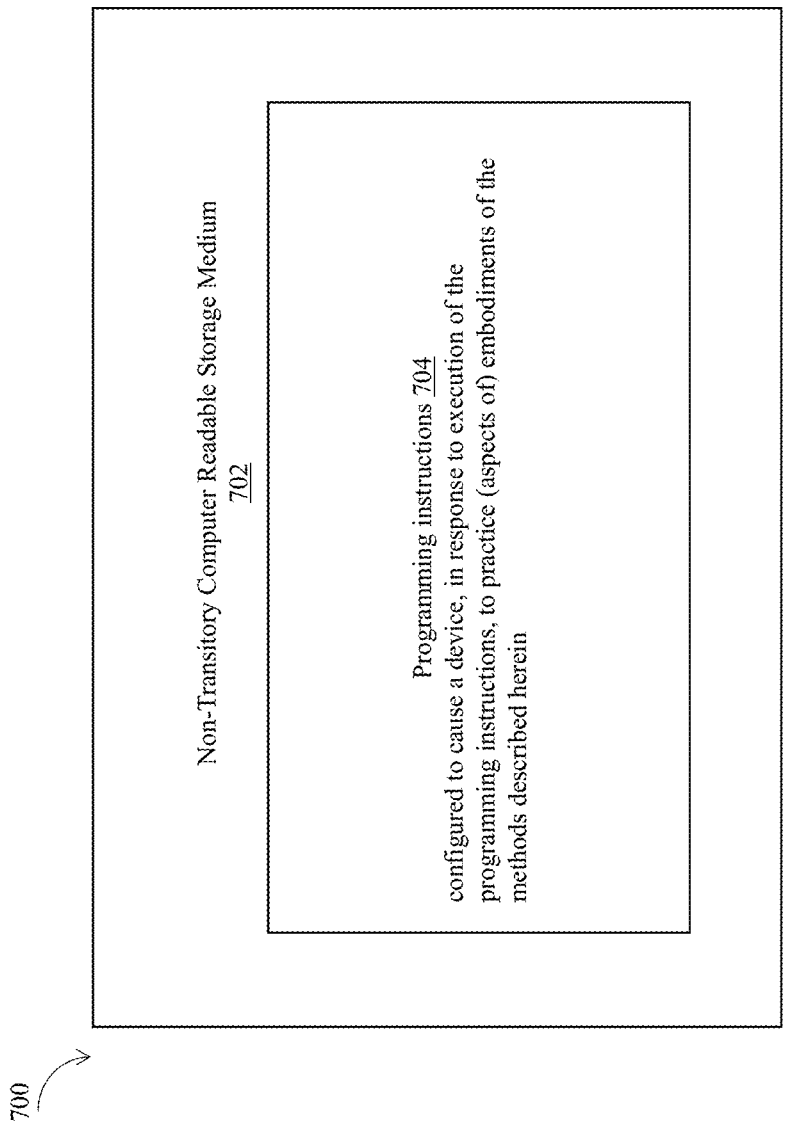
FIG. 7 illustrates a storage medium having instructions for practicing methods described with references to FIGS. 1-6, in accordance with various embodiments.

In embodiments, the computing device 101, the computing device 103, the processor core 113, or the processor core 133, may be implemented in various ways, e.g., by a computing platform 600 shown in FIG. 6, and may execute instructions stored in a computer-readable medium, e.g., the computer-readable medium 702 as shown in FIG. 7, or may be pre-configured with the logic (e.g., with appropriate bit streams, logic blocks, etc.).

Figure 3:
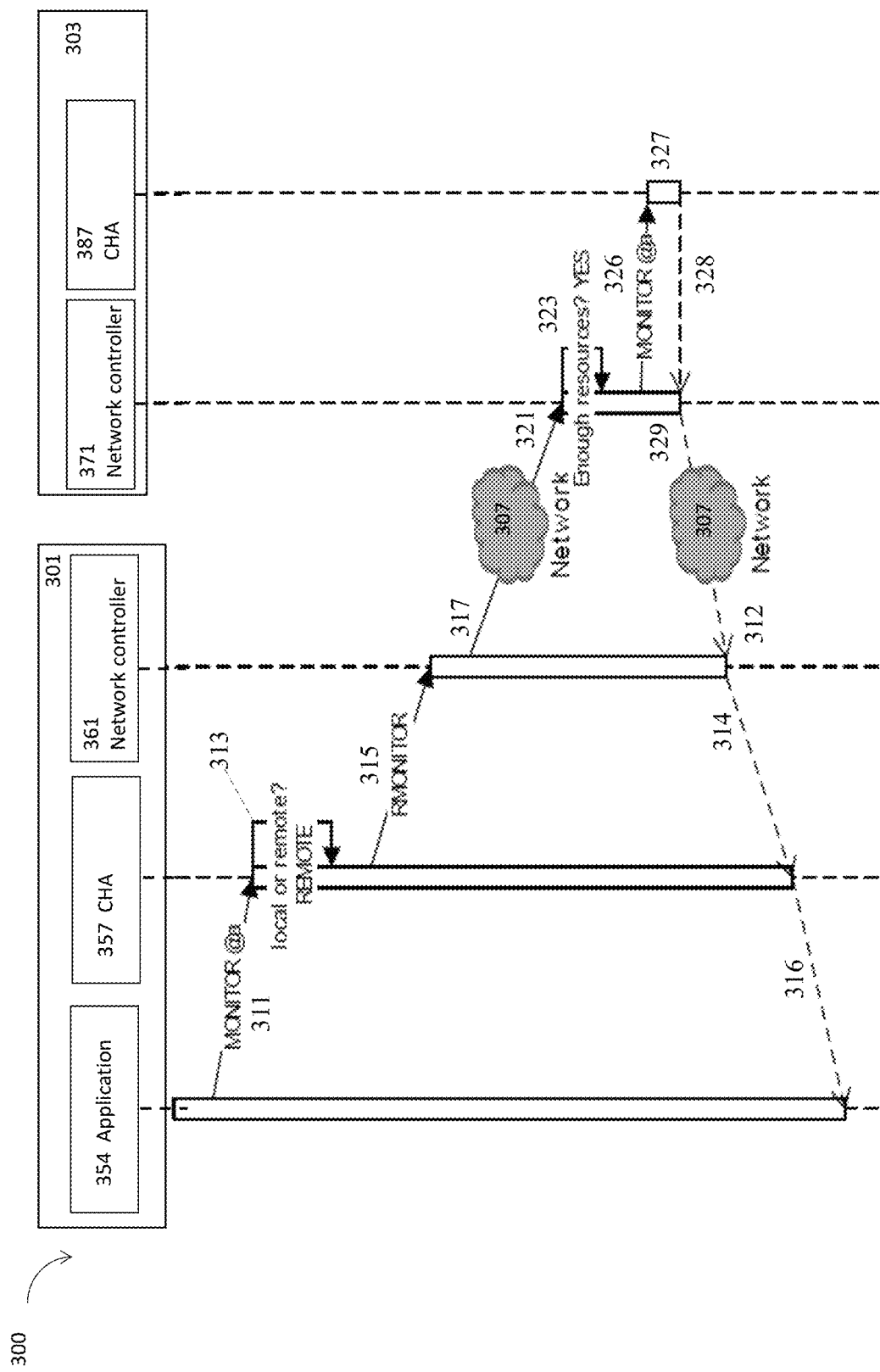
FIG. 3 illustrates an example sequence diagram for remote memory operations performed by multiple computing devices in a computing system having a shared memory address space, in accordance with various embodiments.
Figure 4:
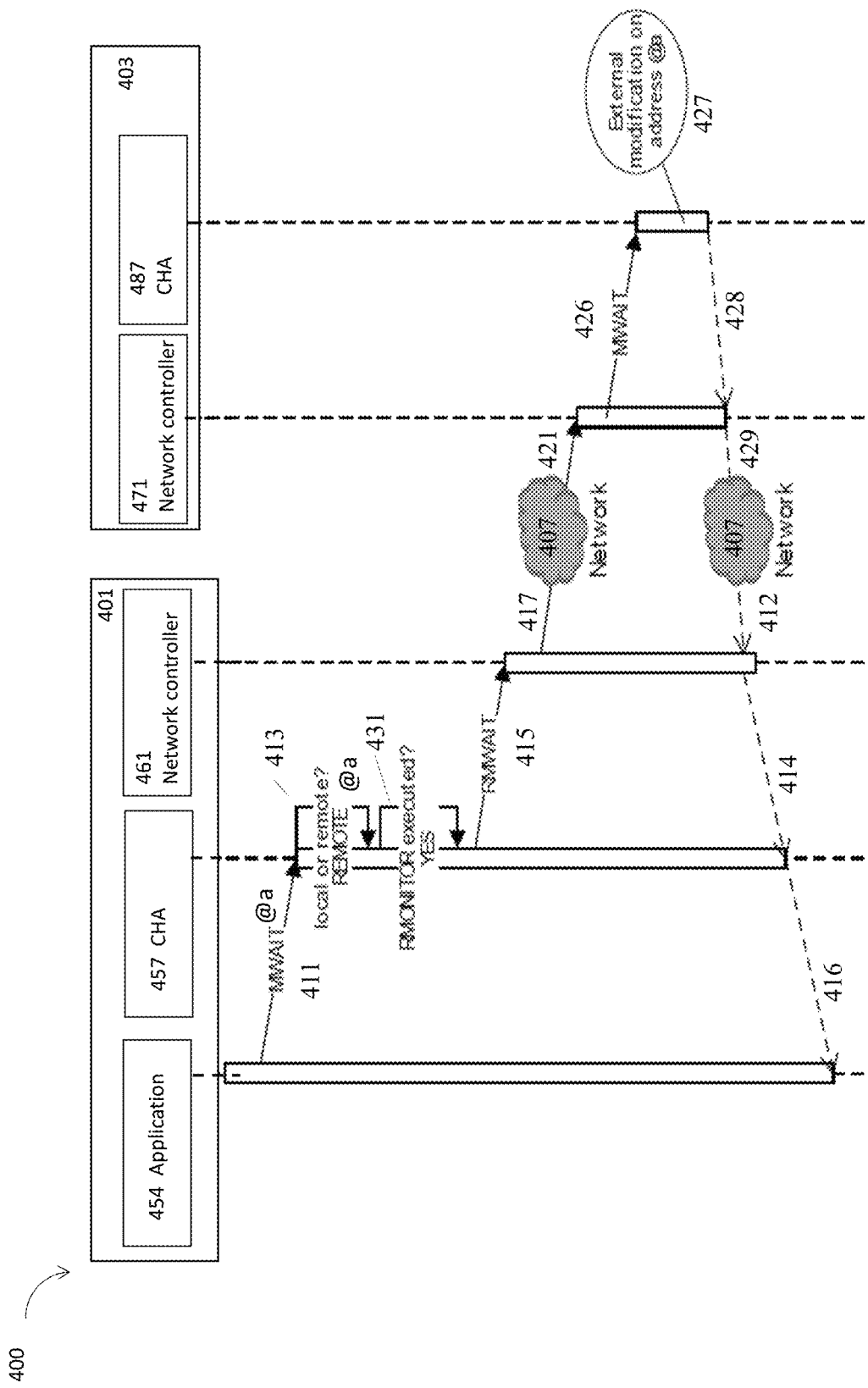
FIG. 4 illustrates an example sequence diagram for remote memory operations performed by multiple computing devices in a computing system having a shared memory address space, in accordance with various embodiments.
Figure 5:
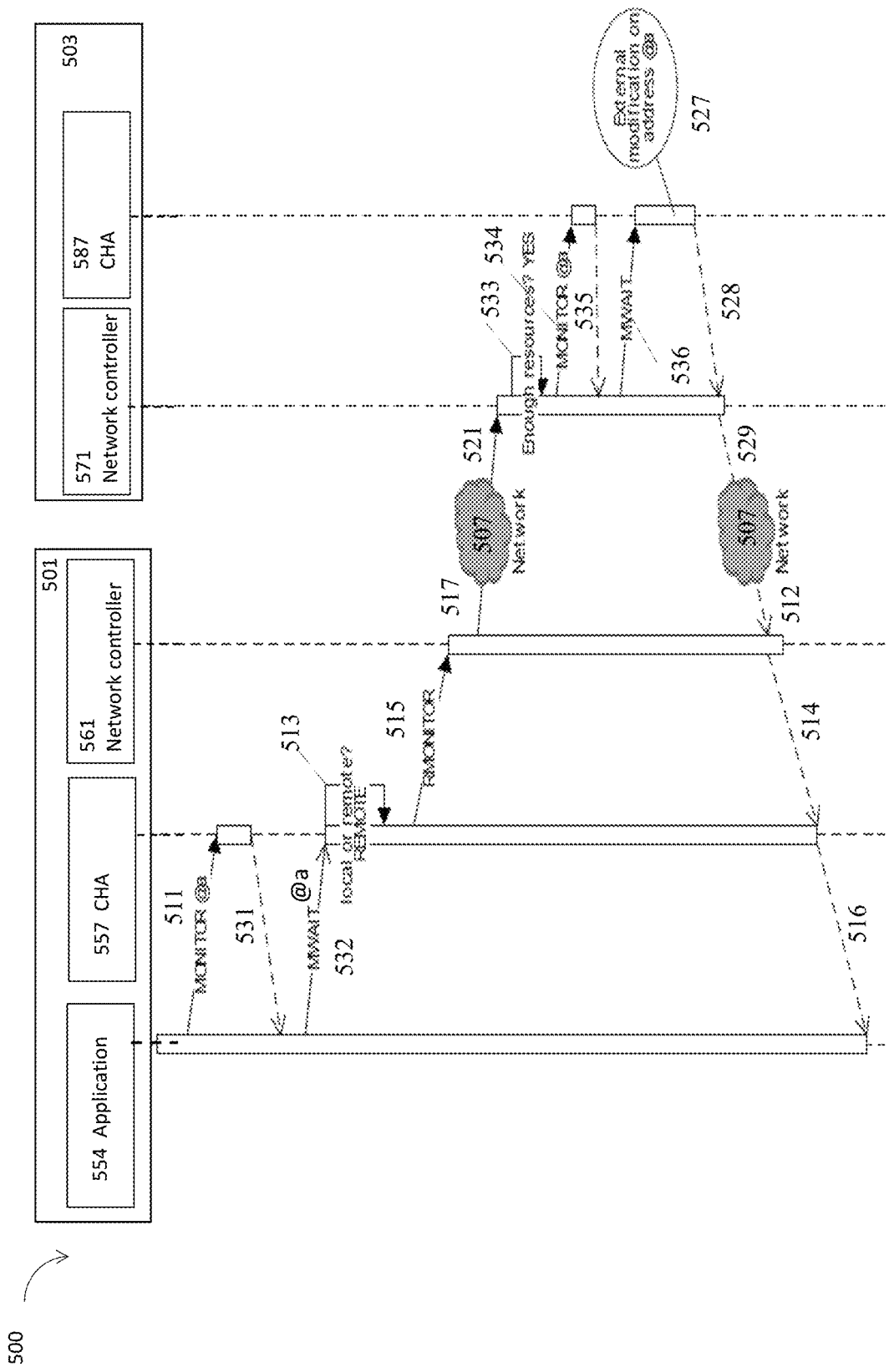
FIG. 5 illustrates an example sequence diagram for remote memory operations performed by multiple computing devices in a computing system having a shared memory address space, in accordance with various embodiments.

FIGS. 3-5 illustrate example sequence diagrams for remote memory operations performed by multiple computing devices in a computing system having a shared memory address space, in accordance with various embodiments. FIG. 3 shows a sequence diagram of operations for the memory operation MONITOR, FIG. 4 shows a sequence diagram of operations for the memory operation MWAIT, while FIG. 5 shows a sequence diagram of operations for the merged memory operation MERGE/MWAIT. The sequence diagrams shown in FIGS. 3-5 are examples of the process 210 or the process 220 illustrated in FIGS. 2(a)-2(b). In some embodiments, the MONITOR/MWAIT instructions are implemented by various registers to store control variables, e.g., a control variable TRIGGER stored in general purpose registers, e.g., EAX, EBX and ECX registers in an Intel® processor.

FIG. 3 illustrates an example sequence diagram 300 for a remote memory operation MONITOR performed by multiple computing devices, e.g., a computing device 301, and a computing device 303, in a computing system having a shared memory address space, in accordance with various embodiments. The computing device 301 and the computing device 303 are coupled together by a network switch 307. In embodiments, the computing device 301, the computing device 303, and the network switch 307 are examples of the computing device 101, the computing device 103, and the network switch 107. The computing device 301 includes an application 354, a CHA 357 to operate on a processor core of the computing device 301, and a network controller 361, while other components of the computing device 301, e.g., a processor core to operate the CHA 357, not shown. The computing device 303 includes a CHA 387 to operate on a processor core of the computing device 303, and a network controller 371, while other components of the computing device 303 not shown. The operations performed by the CHA 357 or the CHA 387 are carried out by the respective processor core supporting the CHA.

In embodiments, at interaction 311, a memory operation, e.g., MONITOR, and together with a memory address @a, is generated by the application 354 and sent to the CHA 357. At interaction 313, the CHA 357 receives the memory operation instruction, e.g., MONITOR, to operate on the memory address @a in a shared memory address space. The CHA 357 determines the memory address @a to be a remote memory address that is local to a processor core in the computing device 303. At interaction 315, the CHA 357 generates a remote memory operation request, e.g., RMONITOR, corresponding to the memory operation instruction MONITOR to operate on the remote memory address @a, and transmits the remote memory operation request, e.g., RMONITOR, to the network controller 361 to be forward to the processor core in the computing device 303. The remote memory operation request RMONITOR includes the memory address @a. At interaction 317, through the network switch 307, the network controller 361 forwards the remote memory operation request, e.g., RMONITOR, to the network controller 371 in the computing device 303.

In embodiments, at interaction 321, the network controller 371 is to receive the remote memory operation request, e.g., RMONITOR, associated with a remote memory address @a that is local to the processor core of the computing device 303. At interaction 323, the network controller 371 is to determine whether there is enough resources to fulfill the remote memory operation request, e.g., RMONITOR. The network controller 371 is coupled to a local storage, e.g., the local storage 141 for the network device 131, to store multiple remote memory operation requests, and the network controller 371 is to determine whether there is enough resources to fulfill the remote memory operation request based on available resources for the processor core and the stored multiple remote memory operation requests. Information stored in the local storage includes a status of a remote memory operation request, an identification of a network controller from which the remote memory operation request is received, and a local memory address associated with the remote memory operation request. For example, Table 1 below shows an example for 4-entry table to manage 4 outstanding remote MONITOR or other remote memory instructions. As shown in Table 1, only two entries are being used (entries with IDs 0 and 1). The first entry refers to a monitoring request from the network controller 361 for address @a. The network controller 371 has registered a request from node N2 to monitor another address (@b). Other entries are freed (marked Used as N) after the execution. Table 1 only shows an example. For different computing devices 301 and 303, there may be different sizes of tables to store the remote memory operation requests.

TABLE 1

| Entry ID | Used (Y/N) | Partner HFI | Address Monitored |
|---|---|---|---|
| 0 | Y | N0 | @a |
| 1 | Y | N2 | @b |
| 2 | N | — | — |
| 3 | N | — | — |

In embodiments, at interaction 326, after the network controller 371 has determined there is enough resources to fulfill the remote memory operation request, e.g., RMONITOR, at address @a, the network controller 371 is to convert the remote memory address @a into a local memory address, and translate the remote memory operation request, e.g., RMONITOR, into a local memory operation, e.g., MONITOR, to be operated on the local memory address by the CHA 387. Hence, the network controller 361 mimics the execution of MONITOR instruction on the CHA 387, while still allowing the CHA 387 to serve different monitoring remote requests concurrently.

Additionally and alternatively, when there is not enough resources to fulfill the remote memory operation request associated, the network controller 371 notifies the network controller 361 that the remote memory operation request cannot be fulfilled, not shown. There may be many different ways to notify the network controller 361 that the remote memory operation request cannot be fulfilled, e.g., by returning a NOP operation, or returning an ERROR message.

In embodiments, at interaction 327, the CHA 387 or the processor core operating the CHA 387 is to configure a local memory operation logic based on the local memory operation and the local memory address, and perform the MONITOR operation. At interaction 328, the network controller 371 is to receive a trigger message generated by the local memory operation logic related to the local memory operation and the local memory address to indicate a status of the local memory operation and the local memory address. At an interaction 329, the network controller 371 is to notify the network controller 361 about the status of the remote memory operation request through the network switch 307.

Furthermore, at interaction 312, the network controller 361 is to receive a notification from the network controller 371 regarding a status of the remote memory operation request. At interaction 314, the network controller 361 is to update the CHA 357 about the status of the remote memory operation request received from the network controller 371. At interaction 316, the application 354 is to receive a status of the remote memory operation request from the network controller 361, wherein the status is based on a remote memory operation executed on the processor core of the computing device 303.

FIG. 4 illustrates an example sequence diagram 400 for a remote memory operation MWAIT performed by multiple computing devices, e.g., a computing device 401, and a computing device 403, in a computing system having a shared memory address space, in accordance with various embodiments. The computing device 401 and the computing device 403 are coupled together by a network switch 407. In embodiments, the computing device 401, the computing device 403, and the network switch 407 are examples of the computing device 101, the computing device 103, and the network switch 107. The computing device 401 includes an application 454, a CHA 457 to operate on a processor core of the computing device 401, and a network controller 461, while other components of the computing device 401, e.g., a processor core to operate the CHA 457, not shown. The computing device 403 includes a CHA 487 to operate on a processor core of the computing device 403, and a network controller 471, while other components of the computing device 403 not shown. The operations performed by the CHA 457 or the CHA 487 are carried out by the respective processor core supporting the CHA.

In embodiments, at interaction 411, a memory operation, e.g., MWAIT, and together with a memory address @a, is generated by the application 454 and sent to the CHA 457. At interaction 413, the CHA 457 receives the memory operation instruction, e.g., MWAIT, to operate on the memory address @a in a shared memory address space. The CHA 457 determines the memory address @a to be a remote memory address that is local to a processor core in the computing device 403. In addition, at interaction 431, the CHA 457 further determines whether a related remote memory operation, e.g., RMONITOR, has been executed or not. If the related remote memory operation has been executed, at interaction 415, the CHA 357 generates a remote memory operation request, e.g., RMWAIT, corresponding to the memory operation instruction MWAIT to operate on the remote memory address @a, and transmits the remote memory operation request, e.g., RMWAIT, to the network controller 461 to be forward to the processor core in the computing device 403. The remote memory operation request RMWAIT may include the memory address @a. At interaction 417, through the network switch 407, the network controller 461 forwards the remote memory operation request, e.g., RMWAIT, to the network controller 471 in the computing device 403.

In embodiments, at interaction 421, the network controller 471 is to receive the remote memory operation request, e.g., RMWAIT, associated with a remote memory address @a that is local to the processor core of the computing device 403. At interaction 426, the network controller 471 is to convert the remote memory address @a into a local memory address, and translate the remote memory operation request, e.g., RMWAIT, into a local memory operation, e.g., MWAIT, to be operated on the local memory address by the CHA 387. At interaction 427, the CHA 487 or the processor core operating the CHA 487 is to configure a local memory operation logic based on the local memory operation and the local memory address, and perform the MWAIT operation to see any external modification on the address @a has been performed or not.

In embodiments, at interaction 428, the network controller 471 is to receive a trigger message generated by the local memory operation logic related to the local memory operation and the local memory address to indicate a status of the local memory operation and the local memory address. At an interaction 429, the network controller 471 is to notify the network controller 461 about the status of the remote memory operation request through the network switch 407.

Furthermore, at interaction 412, the network controller 461 is to receive a notification from the network controller 471 regarding a status of the remote memory operation request. At interaction 414, the network controller 461 is to update the CHA 457 about the status of the remote memory operation request received from the network controller 471. At interaction 416, the application 454 is to receive a status of the remote memory operation request from the network controller 461, wherein the status is based on a remote memory operation executed on the processor core of the computing device 403.

FIG. 5 illustrates an example sequence diagram 500 for remote memory operations MWAIT and MONITOR, performed by multiple computing devices, e.g., a computing device 501, and a computing device 503, in a computing system having a shared memory address space, in accordance with various embodiments. The computing device 501 and the computing device 503 are coupled together by a network switch 507. In embodiments, the computing device 501, the computing device 503, and the network switch 507 are examples of the computing device 101, the computing device 103, and the network switch 107. The computing device 501 includes an application 554, a CHA 557 to operate on a processor core of the computing device 501, and a network controller 561, while other components of the computing device 501, e.g., a processor core to operate the CHA 557, not shown. The computing device 503 includes a CHA 587 to operate on a processor core of the computing device 503, and a network controller 571, while other components of the computing device 503 not shown. The operations performed by the CHA 557 or the CHA 587 are carried out by the respective processor core supporting the CHA. Different from the sequence diagram 300 and the sequence diagram 400, the sequence diagram 500 shown in FIG. 5 shows a remote memory operation request that merges the semantics of the MERGE/MWAIT instructions to save network bandwidth by transmitting one single request over the network for two remote memory operations.

In embodiments, at interaction 511, a memory operation, e.g., MONITOR, and together with a memory address @a, is generated by the application 554 and sent to the CHA 557. At interaction 531, the CHA 557 waits for the related memory operation, e.g., MWAIT to be generated. At interaction 532, the related memory operation, e.g., MWAIT, is generated by the application 554 and sent to the CHA 557, and the CHA 557 has received both MONITOR and MWAIT by this moment. At interaction 513, the CHA 557 receives the memory operation instructions, e.g., MONITOR and MWAIT, to operate on the memory address @a in a shared memory address space. The CHA 457 determines the memory address @a to be a remote memory address that is local to a processor core in the computing device 503. At interaction 515, the CHA 557 generates a remote memory operation request, e.g., RMONITOR, corresponding to the merged memory operations, MONITOR and MWAIT, to operate on the remote memory address @a, and transmits the remote memory operation request, e.g., RMONITOR, to the network controller 561 to be forward to the processor core in the computing device 503. At interaction 517, through the network switch 507, the network controller 561 forwards the remote memory operation request, e.g., RMONITOR, to the network controller 571 in the computing device 503.

In embodiments, at interaction 521, the network controller 571 is to receive the remote memory operation request, e.g., RMONITOR, associated with a remote memory address @a that is local to the processor core of the computing device 503. At interaction 533, the network controller 571 is to determine whether there is enough resources to fulfill the remote memory operation request, e.g., RMONITOR. Once the network controller 571 determines there is enough resources to fulfill the remote memory operation request, at interaction 534 and interaction 536, the network controller 571 is to convert the remote memory address @a into a local memory address, and translate the remote memory operation request, e.g., RMONITOR, into multiple local memory operations, e.g., MONITOR and MWAIT, to be operated on the local memory address by the CHA 587. As shown in FIG. 5, at interaction 535, the MONITOR operation is to be performed first, and the CHA 587 notifies the network controller 571 once the MONITOR operation is performed. In some other embodiments, the MWAIT operation is performed first before the MONITOR operation. At interaction 527, the CHA 587 or the processor core operating the CHA 587 is to configure a local memory operation logic based on the local memory operation and the local memory address, and perform the MWAIT operation to see any external modification on the address @a has been performed or not.

In embodiments, at interaction 528, the network controller 571 is to receive a trigger message generated by the local memory operation logic related to the local memory operation and the local memory address to indicate a status of the local memory operation and the local memory address. At an interaction 529, the network controller 571 is to notify the network controller 561 about the status of the remote memory operation request through the network switch 507.

Furthermore, at interaction 512, the network controller 561 is to receive a notification from the network controller 571 regarding a status of the remote memory operation request. At interaction 514, the network controller 561 is to update the CHA 557 about the status of the remote memory operation request received from the network controller 571. At interaction 516, the application 554 is to receive a status of the remote memory operation request from the network controller 561, wherein the status is based on a remote memory operation executed on the processor core of the computing device 503.

The memory operations MONITOR, MWAIT, and the merged MONITOR/MWAIT, shown in FIGS. 3-5 are for examples only. There may be other memory operations that can be extended to remote memory operations. For example, a memory operation that can reflect the changes at the monitored address can be similarly performed. In some detail, a first application at a first device may place a remote MONITOR over a remote memory address, wherever this range might be implemented. The first application includes, along with this remote request, a local storage address of the first device, for transmitting the updated content at the remote memory address when a remote MWAIT is triggered by a write to the remote memory address. The first application on the first device may not have any idea what application writes to the monitored remote memory address. The network controller at the node where this remote-monitored memory address is mapped generates a send when triggered by a write to the monitored remote memory address, and sends the page data by whatever transport to the first device. When a network controller at the first device completes the local reflection of the remote memory address, the first application receives notification proceeds to update the content at the assigned local storage address to reflect the updated content at the remote memory address. In addition, multiple applications may operate on the first device to request the same remote memory address to be monitored and updated. The network controller of the first device can update the multiple applications operating on the first device automatically.

FIG. 6 illustrates an example computer device 600 that may be suitable as a device to practice selected aspects of the present disclosure. As shown, the computer device 600 may include one or more processors 602, each having one or more processor cores, and associated with one or more hardware accelerators 603 (which may be an ASIC, a FPGA, or a collection of one or more ICs). In alternative embodiments, the hardware accelerator(s) 603 may be part of processor 602, or integrated together on a SOC. Additionally, the computer device 600 may include a memory 604, which may be any one of a number of known random access memory, and mass storage 606 that may be any one of a number of persistent storage medium. In addition, the computer device 600 may include input/output devices 608. Furthermore, the computer device 600 may include communication interfaces 614, and a network device 631. Communication interface 614 or the network device 631 may be any one of a number of known communication interfaces. The elements may be coupled to each other via system bus 612, which may represent one or more buses. In the case of multiple buses, they may be bridged by one or more bus bridges (not shown).

In embodiments, the one or more processors 602, the communication interfaces 614, the network device 631, the memory 604, or the mass storage 606 may be similar to the network device 131, the processor core 133, and the memory device 135, respectively, as shown in FIG. 1. For example, the processors 602 may include a cache 635, a CHA 637, and a monitor logic 634. The network device 631 includes a local storage 633 and a network controller 632. In some embodiments, the communication interfaces 614 may be part of the network device 631. The cache 635, the CHA 637, the monitor logic 634, the local storage 633, and the network controller 632 may be examples of corresponding parts of the computing device 101 or the computing device 103.

Each of these elements may perform its conventional functions known in the art, or as described in the current disclosure. In various embodiments, computational logic 622 may implement an operating system or one or more application, such as the process 210 or the process 220 shown in FIGS. 2(a)-2(b), or operations shown in the sequence diagram 300, the sequence diagram 400, or the sequence diagram 500, as shown in FIGS. 3-5. Computational logic 622 may be implemented by assembler instructions supported by processor(s) 602 or high-level languages, such as, for example, C, that can be compiled into such instructions.

The number, capability and/or capacity of these elements 601-637 may vary, depending on the usage of computer device 600. Otherwise, the constitutions of elements 601-637 are known, and accordingly will not be further described.

As will be appreciated by one skilled in the art, the present disclosure may be embodied as methods or computer program products. Accordingly, the present disclosure, in addition to being embodied in hardware as earlier described, may also include certain software components (including firmware, resident software, micro-code, etc.) or an embodiment combining software and hardware aspects that may all generally be referred to as a "circuit," "module," or "system."

Furthermore, the present disclosure may include a computer program product embodied in any tangible or non-transitory medium of expression having computer-usable program code embodied in the medium. FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 702 may include a number of programming instructions 704. Programming instructions 704 may be configured to enable a device, e.g., device 600, in response to execution of the programming instructions in a controller or a processor, to perform, e.g., various operations of various applications, such as the process 210 or the process 220 shown in FIGS. 2(a)-2(b), or operations shown in the sequence diagram 300, the sequence diagram 400, or the sequence diagram 500, as shown in FIGS. 3-5.

In alternative embodiments, programming instructions 704 may be disposed on multiple computer-readable non-transitory storage media 702 instead. In alternate embodiments, programming instructions 704 may be disposed on computer-readable transitory storage media 702, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may include an apparatus, comprising: a first network controller coupled to a first processor core, wherein the first network controller is to: process a remote memory operation request, wherein the remote memory operation request is generated by a first memory coherency agent (CHA) based on a first memory operation for an application operating on the first processor core, and the remote memory operation request is associated with a remote memory address that is local to a second processor core coupled to the first processor core through a network switch; and forward the remote memory operation request through the network switch to a second network controller coupled to the second processor core, wherein the second processor core and the second network controller are to carry out a second memory operation at the remote memory address local to the second processor core, the second memory operation corresponding to the remote memory operation request generated based on the first memory operation.

Example 2 may include the apparatus of example 1 and/or some other examples herein, wherein the remote memory operation request includes the remote memory address in a shared memory address space.

Example 3 may include the apparatus of example 1 and/or some other examples herein, wherein the remote memory operation request is a request for a remote memory monitor operation, a remote memory wait operation, or a merged remote memory monitor and wait operation.

Example 4 may include the apparatus of example 1 and/or some other examples herein, wherein the apparatus is a host fabric interface (HFI), or a network interconnect card (NIC).

Example 5 may include the apparatus of example 1 and/or some other examples herein, wherein the first network controller is further to: receive a notification from the second network controller regarding a status of the remote memory operation request; and update the first memory CHA about the status of the remote memory operation request received from the second network controller.

Example 6 may include the apparatus of example 1 and/or some other examples herein, wherein the remote memory operation request is a first remote memory operation request, the remote memory address is a first remote memory address, and the first network controller is further to: receive, from a third network controller coupled to the first network controller through the network switch, a second remote memory operation request associated with a second remote memory address that is local to the first processor core; and determine whether there is enough resources to fulfill the second remote memory operation request.

Example 7 may include the apparatus of example 6 and/or some other examples herein, wherein the first network controller is further to: convert the second remote memory address into a local memory address for the first processor core.

Example 8 may include the apparatus of example 7 and/or some other examples herein, wherein the first network controller is further to: translate the second remote memory operation request into a local memory operation to be operated on the local memory address by the first memory CHA, if there is enough resources to fulfill the second remote memory operation request.

Example 9 may include the apparatus of example 8 and/or some other examples herein, wherein the first network controller is further to: configure a local memory operation logic based on the local memory operation and the local memory address; receive a trigger message generated by the local memory operation logic related to the local memory operation and the local memory address to indicate a status of the second remote memory operation request; and notify the third network controller about the status of the second remote memory operation request.

Example 10 may include the apparatus of example 9 and/or some other examples herein, wherein the trigger message is generated by the local memory operation logic when there is another local memory operation to be performed on the local memory address.

Example 11 may include the apparatus of example 10 and/or some other examples herein, wherein the another local memory operation is to be performed on the local memory address by another application operating on the first processor core, or by another remote memory operation request.

Example 12 may include the apparatus of example 6 and/or some other examples herein, wherein the apparatus further includes a local storage to store multiple remote memory operation requests, and the first network controller is to determine whether there is enough resources to fulfill the second remote memory operation request based on available resources for the first processor core and the stored multiple remote memory operation requests, and wherein information stored in the local storage includes a status of a remote memory operation request, an identification of a network controller from which the remote memory operation request is received, and a local memory address associated with the remote memory operation request.

Example 13 may include the apparatus of example 12 and/or some other examples herein, wherein the first network controller is further to: respond, to the third network controller, that there is not enough resources to fulfill the second remote memory operation request associated with the second remote memory address that is local to the first processor core, based on the information stored in the local storage for the multiple remote memory operation requests.

Example 14 may include a method for a first processor core, comprising: receiving a memory operation instruction to operate on a memory address in a shared memory address space, wherein the memory operation instruction is for an application operating on the first processor core; determining the memory address to be a remote memory address that is local to a second processor core; generating a remote memory operation request corresponding to the memory operation instruction to operate on the remote memory address; and transmitting the remote memory operation request to a network controller to be forward to the second processor core.

Example 15 may include the method of example 14 and/or some other examples herein, further comprising: determining the memory address to be a local memory address to the first processor core; and executing the memory operation instruction by the first processor core.

Example 16 may include the method of example 14 and/or some other examples herein, wherein the remote memory operation request is a request for a remote memory monitor operation, a remote memory wait operation, or a merged remote memory monitor and wait operation.

Example 17 may include the method of example 14 and/or some other examples herein, wherein the instructions further causes the first processor core, in response to execution by the first processor core, to: receive a status of the remote memory operation request from the network controller, wherein the status is based on a remote memory operation executed on the second processor core, the remote memory operation corresponding to the remote memory operation request; and report a result of the memory operation instruction for the application based on the status of the remote memory operation request.

Example 18 may include the method of example 14 and/or some other examples herein, wherein the memory operation instruction is a first memory operation instruction, the remote memory operation request is a first remote memory operation request, the remote memory address is a first remote memory address, and the instructions further causes the first processor core, in response to execution by the first processor core, to: receive a second memory operation from the network controller, wherein the second memory operation corresponding to a second remote memory operation request received by the network controller, the second memory operation being associated with a second local memory address; perform the second memory operation with respect to the second local memory address; and notify the network controller about a status of the second memory operation.

Example 19 may include the method of example 18 and/or some other examples herein, wherein to perform the second memory operation includes to: configure a local memory operation logic based on the second memory operation and the second local memory address; and receive a trigger message generated by the local memory operation logic related to the second memory operation and the second local memory address to indicate a status of the second remote memory operation request.

Example 20 may include the method of example 19 and/or some other examples herein, wherein the trigger message is generated by the local memory operation logic when there is another local memory operation to be performed on the second local memory address.

Example 21 may include the method of example 20 and/or some other examples herein, wherein the another local memory operation is to be performed on the second local memory address by another application operating on the first processor core, or by another remote memory operation request.

Example 22 may include a computing device, comprising: a first processor core, wherein the first processor core is to generate a remote memory operation request based on a first memory operation for an application operating on the first processor core, and the remote memory operation request is associated with a remote memory address that is local to a second processor core coupled to the first processor core through a network switch; and a first network controller coupled to the first processor core and the network switch, wherein the first network controller is to process the remote memory operation request generated by the first processor core, and forward the remote memory operation request through the network switch to a second network controller coupled to the second processor core, wherein the second processor core and the second network controller are to carry out a second memory operation that is to extend the first memory operation through the network switch, the first network controller, and the second network controller.

Example 23 may include the computing device of example 22 and/or some other examples herein, wherein the remote memory operation request includes the remote memory address in a shared memory address space.

Example 24 may include the computing device of example 22 and/or some other examples herein, wherein the remote memory operation request is a request for a remote memory monitor operation, a remote memory wait operation, or a merged remote memory monitor and wait operation.

Example 25 may include the computing device of example 22 and/or some other examples herein, wherein the remote memory operation request is generated by a memory coherency agent (CHA) operating on the first processor core, and wherein the first network controller is further to receive a notification from the second network controller regarding a status of the remote memory operation request, and update the CHA about the status of the remote memory operation request received from the second network controller.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus, comprising:
 a first network controller coupled to a first processor core, wherein the first network controller is to:
  process a remote memory operation request, wherein the remote memory operation request is generated by a first memory coherency agent (CHA) based on a first memory operation for an application operating on the first processor core, and the remote memory operation request is associated with a remote memory address that is local to a second processor core coupled to the first processor core through a network switch; and forward the remote memory operation request through the network switch to a second network controller coupled to the second processor core, wherein the second processor core and the second network controller are to carry out a second memory operation at the remote memory address local to the second processor core, the second memory operation corresponding to the remote memory operation request generated based on the first memory operation.

2. The apparatus of claim 1, wherein the remote memory operation request includes the remote memory address in a shared memory address space.

3. The apparatus of claim 1, wherein the remote memory operation request is a request for a remote memory monitor operation, a remote memory wait operation, or a merged remote memory monitor and wait operation.

4. The apparatus of claim 1, wherein the apparatus is a host fabric interface (HFI), or a network interconnect card (NIC).

5. The apparatus of claim 1, wherein the first network controller is further to:
receive a notification from the second network controller regarding a status of the remote memory operation request; and
update the first memory CHA about the status of the remote memory operation request received from the second network controller.

6. The apparatus of claim 1, wherein the remote memory operation request is a first remote memory operation request, the remote memory address is a first remote memory address, and the first network controller is further to:
receive, from a third network controller coupled to the first network controller through the network switch, a second remote memory operation request associated with a second remote memory address that is local to the first processor core; and
determine whether there are enough resources to fulfill the second remote memory operation request.

7. The apparatus of claim 6, wherein the first network controller is further to:
convert the second remote memory address into a local memory address for the first processor core.

8. The apparatus of claim 7, wherein the first network controller is further to:
translate the second remote memory operation request into a local memory operation to be operated on the local memory address by the first memory CHA, if there are enough resources to fulfill the second remote memory operation request.

9. The apparatus of claim 8, wherein the first network controller is further to:
configure a local memory operation logic based on the local memory operation and the local memory address;
receive a trigger message generated by the local memory operation logic related to the local memory operation and the local memory address to indicate a status of the second remote memory operation request; and
notify the third network controller about the status of the second remote memory operation request.

10. The apparatus of claim 9, wherein the trigger message is generated by the local memory operation logic when there is another local memory operation to be performed on the local memory address.

11. The apparatus of claim 10, wherein the another local memory operation is to be performed on the local memory address by another application operating on the first processor core, or by another remote memory operation request.

12. The apparatus of claim 6, wherein the apparatus further includes a local storage to store multiple remote memory operation requests, and the first network controller is to determine whether there are enough resources to fulfill the second remote memory operation request based on available resources for the first processor core and the stored multiple remote memory operation requests, and wherein information stored in the local storage includes a status of a remote memory operation request, an identification of a network controller from which the remote memory operation request is received, and a local memory address associated with the remote memory operation request.

13. The apparatus of claim 12, wherein the first network controller is further to:
respond, to the third network controller, that there are not enough resources to fulfill the second remote memory operation request associated with the second remote memory address that is local to the first processor core, based on the information stored in the local storage for the multiple remote memory operation requests.

14. A computing device, comprising:
a first processor core, wherein the first processor core is to generate a remote memory operation request based on a first memory operation for an application operating on the first processor core, and the remote memory operation request is associated with a remote memory address that is local to a second processor core coupled to the first processor core through a network switch; and
a first network controller coupled to the first processor core and the network switch, wherein the first network controller is to process the remote memory operation request generated by the first processor core, and forward the remote memory operation request through the network switch to a second network controller coupled to the second processor core, wherein the second processor core and the second network controller are to carry out a second memory operation that is to extend the first memory operation through the network switch, the first network controller, and the second network controller.

15. The computing device of claim 14, wherein the remote memory operation request includes the remote memory address in a shared memory address space.

16. The computing device of claim 14, wherein the remote memory operation request is a request for a remote memory monitor operation, a remote memory wait operation, or a merged remote memory monitor and wait operation.

17. The computing device of claim 14, wherein the remote memory operation request is generated by a memory coherency agent (CHA) operating on the first processor core, and wherein the first network controller is further to receive a notification from the second network controller regarding a status of the remote memory operation request, and update the CHA about the status of the remote memory operation request received from the second network controller.

* * * * *